United States Patent
Allen et al.

(10) Patent No.: US 8,984,045 B2
(45) Date of Patent: Mar. 17, 2015

(54) DIGITAL METHOD OF RECRUITMENT

(71) Applicant: LinkedIn Corporation, Mountain View, CA (US)

(72) Inventors: Christina Allen, Mountain View, CA (US); Farid Hosseini, San Francisco, CA (US); Seth M. McLaughlin, Palo Alto, CA (US)

(73) Assignee: LinkedIn Corporation, Mountain View, CA (US)

( * ) Notice: Subject to any disclaimer, the term of this patent is extended or adjusted under 35 U.S.C. 154(b) by 232 days.

(21) Appl. No.: 13/714,265

(22) Filed: Dec. 13, 2012

(65) Prior Publication Data

US 2014/0172969 A1    Jun. 19, 2014

(51) Int. Cl.
*G06F 15/16* (2006.01)
*H04L 29/06* (2006.01)
*G06Q 10/10* (2012.01)
*G06Q 50/00* (2012.01)

(52) U.S. Cl.
CPC .......... *H04L 65/403* (2013.01); *G06Q 10/1053* (2013.01); *G06Q 10/105* (2013.01); *G06Q 50/01* (2013.01)
USPC .......................................... 709/201; 709/207

(58) Field of Classification Search
CPC ......... H04L 67/22; H04L 67/30; H04L 51/32; H04L 65/403; G06Q 10/105; G06Q 10/1053; G06Q 50/01
USPC .......................................... 709/206, 201, 207
See application file for complete search history.

(56) References Cited

U.S. PATENT DOCUMENTS

| | | | | |
|---|---|---|---|---|
| 8,661,045 | B2 * | 2/2014 | Raz et al. | 707/749 |
| 2010/0262550 | A1 * | 10/2010 | Burritt et al. | 705/319 |
| 2013/0318180 | A1 * | 11/2013 | Amin et al. | 709/206 |

* cited by examiner

*Primary Examiner* — Kristie Shingles
(74) *Attorney, Agent, or Firm* — Park, Vaughan, Fleming & Dowler LLP

(57) ABSTRACT

A technique for identifying a group of potential candidates to join an organization is described. During this analysis technique, an identifier is received from an individual. This identifier may be used to associate the individual with a pre-existing profile that includes information. For example, the identifier may include a link to the pre-existing profile. Alternatively, a profile with the information may be generated for the individual based on the identifier and an information source. Using the information, an affinity metric of the individual with the organization is calculated, such as a number of employees of the organization who know the individual or who attended a same educational institution as the individual. Moreover, the affinity metric is used to determine whether to include the individual in the group of potential candidates to join the organization. In this way, the analysis technique may facilitate more-efficient recruiting efforts.

18 Claims, 7 Drawing Sheets

DIGITAL METHOD OF RECRUITMENT

BACKGROUND

1. Field

The described embodiments relate to techniques for recruiting potential candidates to join an organization.

2. Related Art

Many organizations visit college or university campuses to identify potential candidates for openings in these organizations. For example, a company may visit a college campus to meet students and to identify those who may be interested in job openings at the company.

Typically, such on-campus recruiting efforts are time-consuming and labor-intensive. Notably, it is often difficult to keep track of all the students that speak with company representatives, as well as to organize the résumés of these students for subsequent processing. Moreover, it can be difficult to assess whether a given student will be a good match for the company, and thus whether it is worthwhile for the company to follow up with the given student. These challenges reduce the efficacy of existing recruiting techniques, which can be frustrating for prospective employers, can significantly increase the associated expenses, and often result in an opportunity cost when qualified candidates are not identified.

SUMMARY

The disclosed embodiments relate to a computer system that identifies a group of potential candidates to join an organization. During operation, the computer system receives an identifier from an individual. Then, the computer system calculates an affinity metric of the individual with the organization based on information associated with the identifier. Next, the computer system determines whether to include the individual in the group of potential candidates to join the organization based on the affinity metric. If the individual is to be included in the group of potential candidates, the computer system adds the individual to the group of potential candidates.

In some embodiments, the computer system associates the individual with a pre-existing profile based on the identifier, where the pre-existing profile includes the information. For example, the identifier may include a link to the pre-existing profile of the individual. This pre-existing profile may specify a social graph associated with the individual, where the social graph includes nodes corresponding to individuals and edges corresponding to connections between the individuals corresponding to the nodes.

Alternatively, the computer system may generate a profile for the individual based on the identifier and an information source, where the profile includes the information. Moreover, the profile may specify the social graph associated with the individual.

Furthermore, the affinity metric may include a number of employees of the organization who know the individual and/or a number of employees of the organization who attended a same educational institution as the individual.

Additionally, the determining whether to include the individual in the group of potential candidates may be based on attributes associated with the individual.

In some embodiments, the receiving, calculating and determining operations are performed by another organization as a service to the organization.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for identifying a group of potential candidates to join an organization, and a computer-program product (e.g., software) for use with the computer system are described. During this analysis technique, an identifier is received from an individual. This identifier may be used to associate the individual with a pre-existing profile that includes information. For example, the identifier may include a link to the pre-existing profile. Alternatively, a profile with the information may be generated for the individual based on the identifier and an information source. Using the information, an affinity metric of the individual with the organization is calculated, such as a number of employees of the organization who know the individual or who attended a same educational institution as the individual. Moreover, the affinity metric is used to determine whether to include the individual in the group of potential candidates to join the organization.

By assisting in the aggregation of the group of potential candidates, the analysis technique may facilitate improved recruiting efforts. In particular, the group of potential candidates may be more likely to be a good match with the organization. As a consequence, subsequent outreach by the organization to individuals in the group of potential candidates may be more successful. Furthermore, by reducing the time and effort needed to aggregate the group of potential candidates, the analysis technique may make the recruiting efforts of the organization more efficient, thereby reducing the cost of such recruiting efforts. In the process, the analysis technique may increase the satisfaction of users of the analysis technique and, thus, may increase the revenue and profitability of a provider of the analysis technique.

In the discussion that follows, an individual, a user or a recipient of the group of potential candidates may include a person (for example, an existing customer, a new customer, a prospective employer, a supplier, a service provider, a vendor, a contractor, etc.). More generally, the analysis technique may be used by an organization, a business and/or a government agency. Furthermore, a 'business' should be understood to include: for-profit corporations, non-profit corporations, groups (or cohorts) of individuals, sole proprietorships, government agencies, partnerships, etc.

Figure 1:
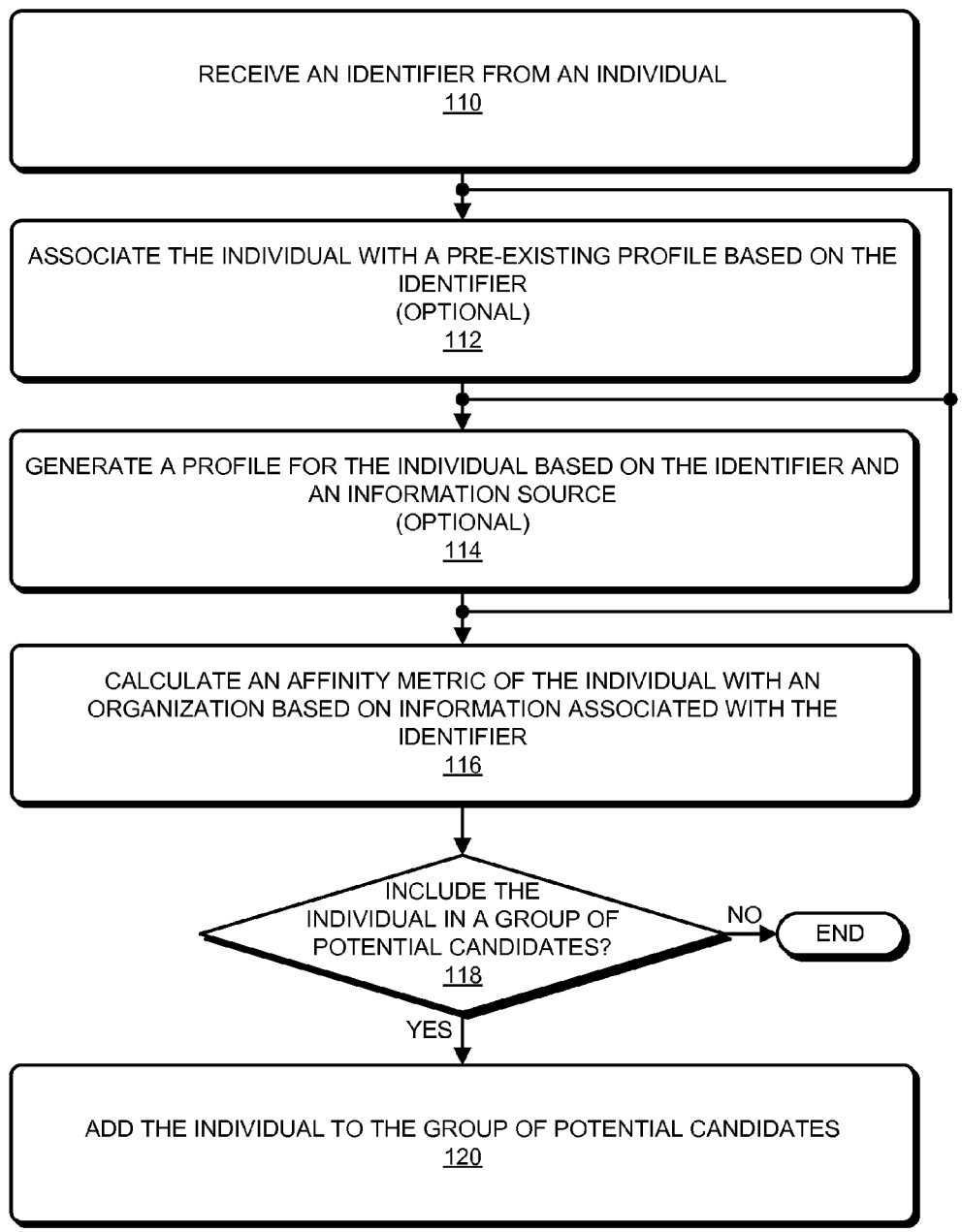
FIG. 1 is a flow chart illustrating a method for identifying a group of potential candidates to join an organization in accordance with an embodiment of the present disclosure.

We now describe embodiments of the method. FIG. 1 presents a flow chart illustrating a method 100 for identifying a group of potential candidates to join an organization, which may be performed by a computer system (such as computer system 600 in FIG. 6). During operation, the computer system receives an identifier from an individual (operation 110).

Then, the computer system calculates an affinity metric of the individual with the organization based on information associated with the identifier (operation 116). For example, the information may include an educational history and/or an employment history of the individual. Moreover, the affinity metric may include a number of employees of the organization who know the individual and/or a number of employees of the organization who attended a same educational institution as the individual.

Next, the computer system determines whether to include the individual in the group of potential candidates to join the organization based on the affinity metric (operation 118). In some embodiments, the determining whether to include the individual in the group of potential candidates (operation 118) is based on attributes associated with the individual. For example, the individual may have experience or skills that are relevant to an open position at the organization. If the individual is to be included in the group of potential candidates (operation 118), the computer system adds the individual to the group of potential candidates (operation 120).

In some embodiments, the computer system optionally associates the individual with a pre-existing profile based on the received identifier (operation 112), where the pre-existing profile includes the information. For example, the identifier may include a link to the pre-existing profile of the individual. As described further below with reference to FIG. 4, this pre-existing profile may specify a social graph associated with the individual, where the social graph includes nodes corresponding to individuals and edges corresponding to connections among the individuals corresponding to the nodes. For example, the edges may represent interrelationships among the individuals, such as organizations (companies, schools, etc.) that the individuals are (or used to be) associated with.

Alternatively, the computer system may optionally generate a profile for the individual based on the received identifier and an information source (operation 114), where the generated profile includes the information. For example, the information source may include school records (or a web page or a website associated with the individual, such as a blog or postings in a social network), and the identifier may include credentials that can be used to access the school records. Moreover, the profile may specify the social graph associated with the individual.

Note that method 100 may be offered by a third party (e.g., another organization) as a paid service to the organization. Therefore, the receiving (operation 110), the calculating (operation 116) and the determining (operation 118) may be performed by the other organization. However, in other embodiments representatives of the organization perform the operations in method 100.

Figure 2:
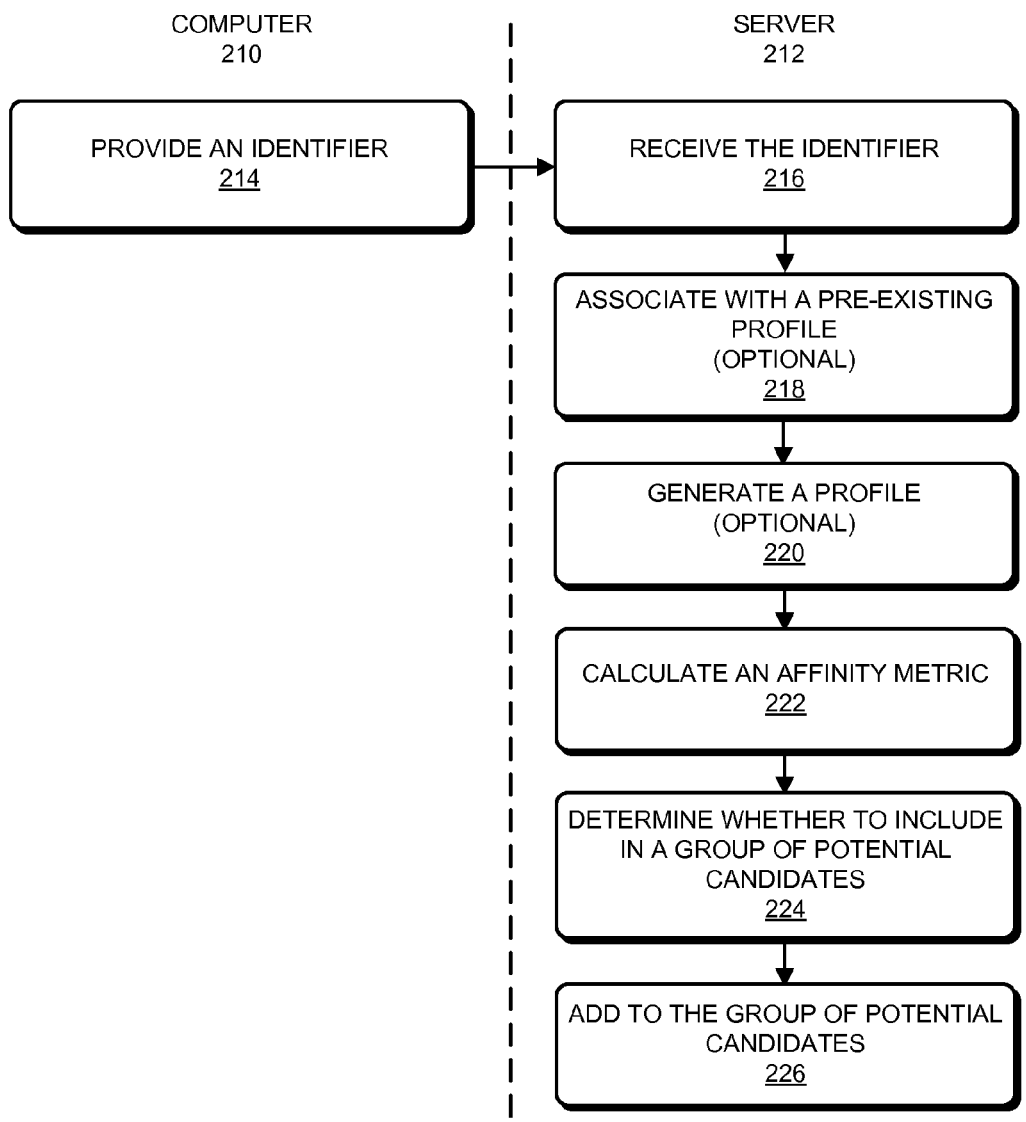
FIG. 2 is a flow chart illustrating the method of FIG. 1 in accordance with an embodiment of the present disclosure.

In an exemplary embodiment, the analysis technique is implemented using a computer and at least one server, which communicate through a network, such as a cellular-telephone network and/or the Internet (e.g., using a client-server architecture). This is illustrated in FIG. 2, which presents a flow chart illustrating method 100 (FIG. 1). During this method, a user of computer 210 (such as the individual) may provide the identifier (operation 214). After receiving the identifier (operation 216), server 212 may optionally associate the user with the pre-existing profile (operation 218). Alternatively, server 212 may optionally generate the profile (operation 220) for the user.

Then, server 212 may calculate an affinity metric (operation 222) of the individual with the organization based on information in the pre-existing profile or the generated profile. Moreover, based on the affinity metric, server 212 may determine whether to include the individual in the group of potential candidates to join the organization (operation 224). If the individual is to be included in the group of potential candidates (operation 224), server 212 may add the individual to the group of potential candidates (operation 226). Note that the group of potential candidates may be used by the organization in subsequent recruiting efforts.

In some embodiments of method 100 (FIGS. 1 and 2), there may be additional or fewer operations. Moreover, the order of the operations may be changed, and/or two or more operations may be combined into a single operation.

In an exemplary embodiment, the analysis technique is used to facilitate recruiting efforts. For example, representatives of the organization may attend a recruiting meeting or presentation at a college or university campus (and, more generally, at a location associated with a school). In principle, such a recruiting meeting can be used to generate leads for subsequent recruiting efforts. In particular, sign-in sheets at the recruiting meeting can be used to obtain the names and contact information of students who may be interested in the organization.

In practice, it can be difficult to obtain timely and useful information about interested students at recruiting meetings, and it may also be difficult to process or screen the interested students to determine which (if any of them) may be a good match for openings in the organization (i.e., which of the students may be good potential candidates). For example, while students often have résumés, it can be difficult to keep track of such documents and to correctly associate them with the students that expressed interest in the organization. Moreover, while some students have electronic profiles (for example, in a social network), other do not. Furthermore, it can be difficult to uniquely associate a given student with the appropriate profile. In addition, managing recruiting events can be time-consuming and difficult, and it is often difficult to keep track of the efficacy of the overall recruiting effort.

These challenges can be addressed using the analysis technique in the context of an overall recruiting and monitoring technique. In this recruiting and monitoring technique, students may interact with a software product (for example, at kiosks) during recruiting meetings. In particular, the students may provide information such as: their names, contact information, links to optional pre-existing profiles (as opposed to or in addition to a physical copy of a résumé), the names of individuals they know in the organization and/or their fields of interest (for example, software development, product management, engineering or business development). To facilitate subsequent processing, the information may be provided in electronic form. For example, a link to a pre-existing profile may include a uniform resource locator or a username of a given student in a social network that includes pre-existing profiles of individuals.

In some embodiments, the students provide the information wirelessly (for example, by bringing their cellular telephones in proximity to a kiosk to convey a virtual or an electronic business card) or using images (for example, a student may provide the information in an image of a Quick Response code that they display on their cellular telephone). Additionally, in some embodiments the kiosks store the information locally until communication access via a network with a remote server (which performs the analysis technique) is available (as illustrated below with reference to FIG. 5).

The information received from the students may be subsequently processed using the analysis technique to identify leads (i.e., the group of potential candidates). The results of the analysis may be presented in a dashboard format so that a user at the organization can monitor or assess the effectiveness of the on-campus recruiting presentations.

Figure 3:
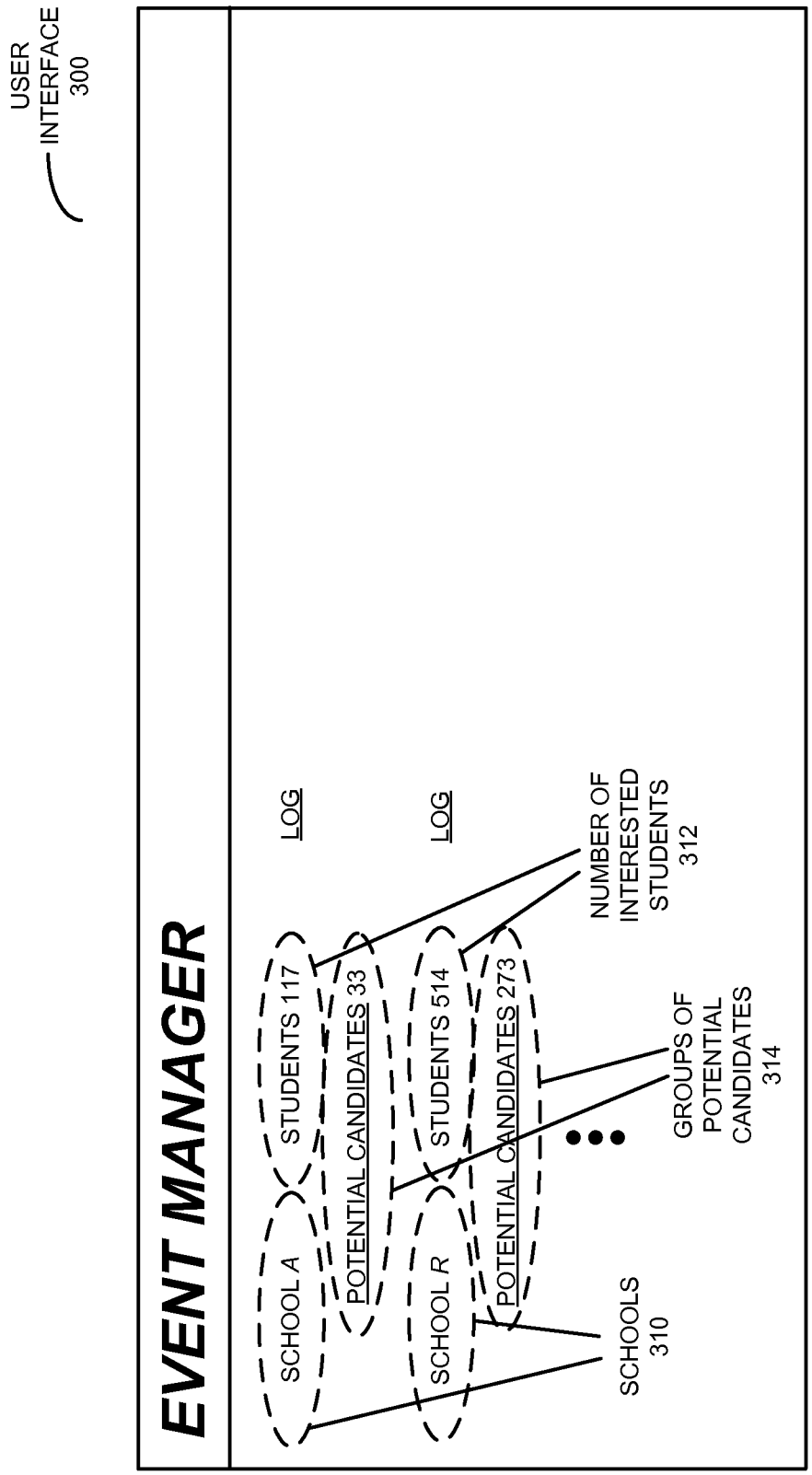
FIG. 3 is a drawing illustrating a user interface for identifying a group of potential candidates to join an organization in accordance with an embodiment of the present disclosure.

This is shown in FIG. 3, which presents a drawing illustrating a user interface 300 for identifying a group of potential candidates to join an organization. In particular, user interface 300 may summarize schools 310, a number of interested students 312, and logs with the information provided by the students (such as the links). In addition, based on the analysis technique, user interface 300 may summarize subsets of the students that are potentially of interest, i.e., groups of potential candidates 314. For example, user interface 300 may include links to groups of potential candidates 314.

Note that the information summarized in user interface 300 may be subsequently used in recruiting efforts of the organization. For example, individuals in groups of potential candidates 314 may be used as leads in a lead management system (or a talent pipeline) that the organization may use to manage the subsequent recruiting efforts. For example, the talent pipeline may be used to search for potential candidates that meet specific criteria (such as skills or experiences). In some embodiments, such criteria are used to filter the students based on their attributes to help specify groups of potential candidates 314.

Note that groups of potential candidates 314 may also be used for longitudinal tracking (i.e., over time). For example, the career profiles of all of students 310 may be monitored to determine if the criteria used to select groups of potential candidates 314 were effective or if they missed qualified candidates (and, thus, the criteria may need to be modified).

Thus, the analysis technique may help facilitate paperless lead generation and management, and therefore may facilitate more effective recruiting efforts by the organization.

Figure 4:
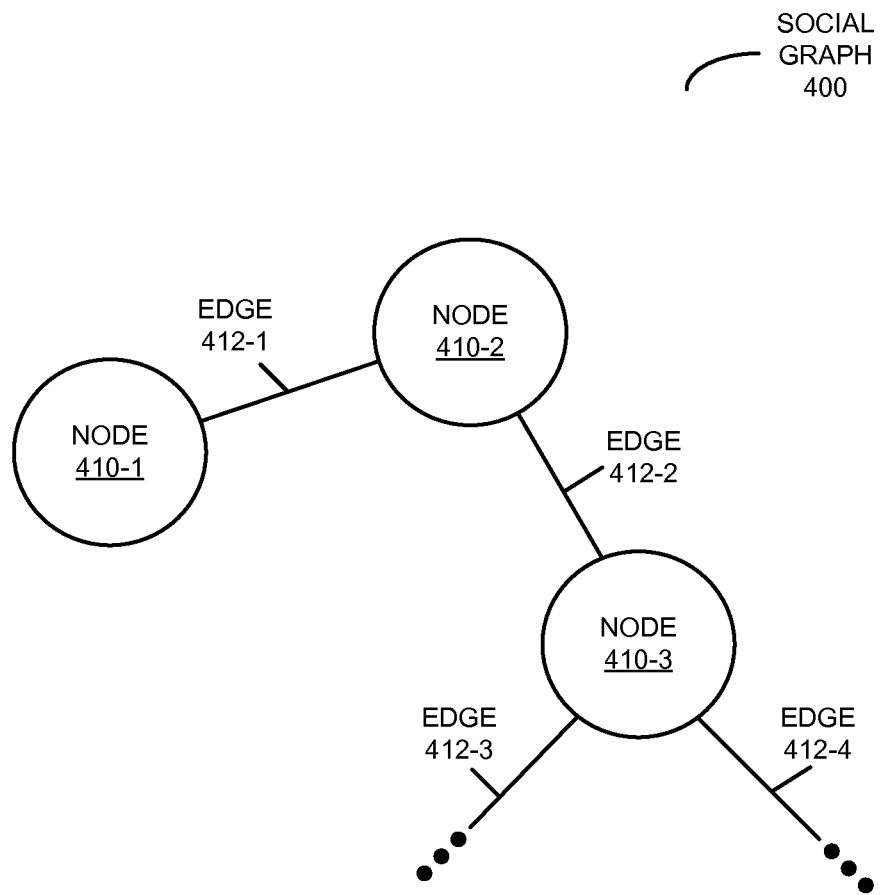
FIG. 4 is a drawing illustrating a social graph in accordance with an embodiment of the present disclosure.

We now further describe the profiles of the individuals. As noted previously, the pre-existing profile or the profile of the individual may, at least in part, specify a social graph. FIG. 4 presents a drawing illustrating a social graph 400. This social graph may represent the connections or interrelationships among nodes 410 (corresponding to entities) using edges 412. In the context of the analysis technique, one of nodes 410 (such as node 410-1) may correspond to the individual, and the remainder of nodes 410 may correspond to members of the organization. Therefore, edges 412 may represent interrelationships among these individuals, such as companies where they worked, schools they attended, etc. As a consequence, social graph 400 may be used to determine the affinity metric, for example, by counting or tracing edges 412 between current members of the organization and the individual.

Figure 5:
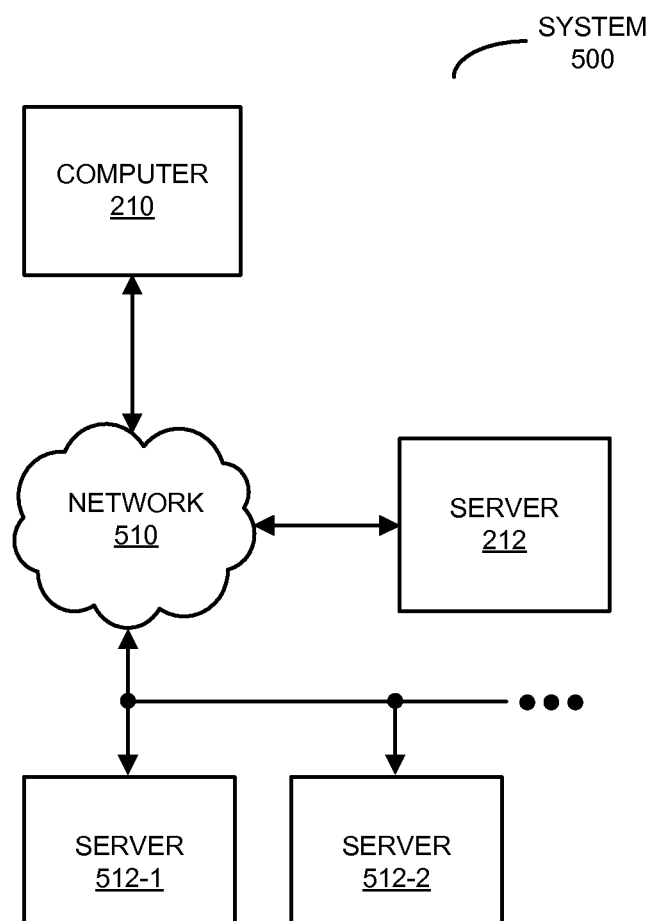
FIG. 5 is a block diagram illustrating a system that performs the method of FIGS. 1 and 2 in accordance with an embodiment of the present disclosure.

We now describe embodiments of the system and the computer system, and their use. FIG. 5 presents a block diagram illustrating a system 500 that performs method 100 (FIGS. 1 and 2). In this system, a user of computer 210 may use a software product, such as a software application that is resident on and that executes on computer 210.

Alternatively, the user may interact with a web page that is provided by server 212 via network 510, and which is rendered by a web browser on computer 210. For example, at least a portion of the software application may be an application tool that is embedded in the web page, and which executes in a virtual environment of the web browser. Thus, the application tool may be provided to the user via a client-server architecture.

The software application operated by the user may be a standalone application or a portion of another application that is resident on and which executes on computer 210 (such as a software application that is provided by server 212 or that is installed and which executes on computer 210).

As discussed previously, the user may use the software application to provide the identifier to computer 210. This identifier may be conveyed to server 212 via network 510. Using the identifier, server 212 may access a pre-existing profile with information associated with the user. This information may be used to calculate the affinity metric and, thus, to determine whether or not to add the user to the group of potential candidates for the organization.

Alternatively, using the identifier, server 212 may access additional information sources at locations, such as servers 512, via network 510. The information at servers 512 may be used to construct or generate a profile for the user. For example, the identifier may include the username of the user on a social network (as well as authorization for a provider of the analysis technique to access the social network). Then, server 212 may scrape at least a portion of the information on the social network (such as an education and employment history of the user), and may use this scraped information to generate the profile. Next, server 212 may use the information in the generated profile to calculate the affinity metric and, thus, to determine whether or not to add the user to the group of potential candidates for the organization.

Note that information in system 500 may be stored at one or more locations in system 500 (i.e., locally or remotely). Moreover, because this data may be sensitive in nature, it may be encrypted. For example, stored data and/or data communicated via network 510 may be encrypted.

Figure 6:
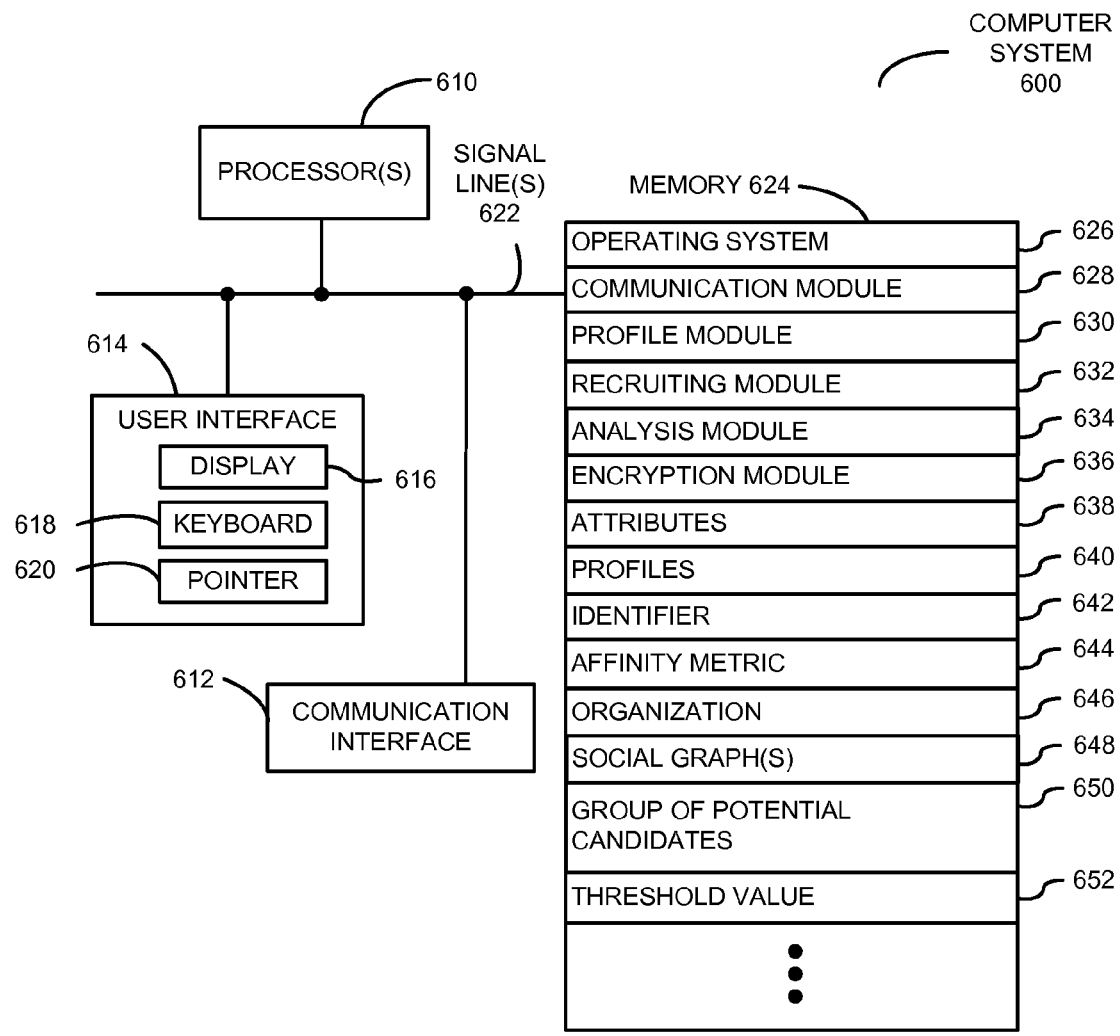
FIG. 6 is a block diagram illustrating a computer system that performs the method of FIGS. 1 and 2 in accordance with an embodiment of the present disclosure.

FIG. 6 presents a block diagram illustrating a computer system 600 that performs method 100 (FIGS. 1 and 2). Computer system 600 includes one or more processing units or processors 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616 (such as a touchscreen), a keyboard 618, and/or a pointer 620, such as a mouse.

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules (or sets of instructions), including: profile module 630 (or a set of instructions), recruiting module 632 (or a set of instructions), analysis module 634 (or a set of instructions) and/or encryption module 636 (or a set of instructions). Note that one or more of these program modules (or sets of instructions) may constitute a computer-program mechanism.

During operation of computer system 600, profile module 630 may receive information from individuals (such as attributes 638, e.g., employment or educational history information) via communication interface 612 and communication module 628. In addition, profile module 630 may aggregate information about the individuals from external information sources (such as web pages or websites) via communication module 628 and communication interface 612. Note that profile module 630 may include this information in profiles 640 that correspond to the individuals.

Subsequently, recruiting module 632 may receive identifier 642 from a user (such as a prospective student) via communication interface 612 and communication module 628. After identifier 642 is received, analysis module 634 may use the information in profiles 640 to calculate an affinity metric 644 of the user with an organization 646. For example, analysis module 634 may use attributes 638 in profiles 640 to generate one or more social graphs 648. These social graphs may be included in a data structure.

Figure 7:
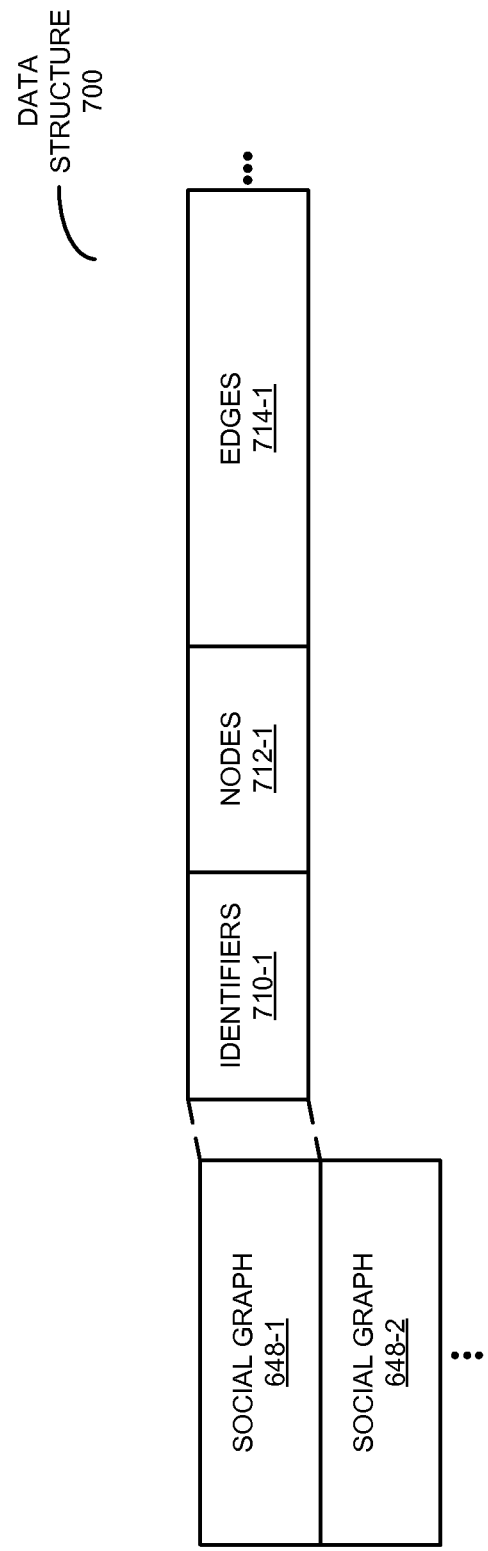
FIG. 7 is a block diagram illustrating a data structure for use in the computer system of FIG. 6 in accordance with an embodiment of the present disclosure.

This is shown in FIG. 7, which presents a block diagram illustrating a data structure 700 with one or more social graphs 648 for use in computer system 600 (FIG. 6). In particular, social graph 648-1 may include: identifiers 710-1 for individuals (such as identifier 642), nodes 712-1 (for associated attributes 638 in FIG. 6), and/or edges 714-1 that represent relationships or connections between nodes 712-1. For example, nodes 712-1 may include: skills, jobs, companies, schools, locations, etc. Thus, nodes 712-1 may indicate interrelationships among the user and individuals at organization 646 (FIG. 6), as indicated by edges 714-1, and therefore one or more of social graphs 648 may be used to calculate affinity metric 644 (FIG. 6).

Referring back to FIG. 6, based on affinity metric 644 analysis module 634 may determine whether or not to include the user in group of potential candidates 650 for organization 646. For example, analysis module 634 may compare affinity metric 644 to a threshold value 652. In particular, affinity metric 644 may be a weighted sum of factors that is normalized to one, and threshold value may be between 0.7 and 0.9. Thus, in this example, if affinity metric 644 exceeds threshold value 652, the user may be included in group of potential candidates 650.

Next, recruiting module 632 may provide group of potential candidates 650 to organization 646 (for example, using communication module 628 and communication interface 612) for use in subsequent monitoring and/or management of the recruiting process at organization 646.

While the preceding discussion illustrates the generation of social graphs 648 in response to the user providing identifier 642 (i.e., in real time or near-real time), in other embodiments the analysis technique may pre-determine at least a portion of one or more of social graphs 648 (for example, based on attributes and information about members of organization 646), so that the one or more social graphs 648 can be rapidly completed once identifier 642 is received from the user. This 'pre-calculating' may allow more rapid calculation of affinity metric 644 and, thus, more rapid selection of group of potential candidates 650, thereby improving the satisfaction of organization 646.

Because information in computer system 600 may be sensitive in nature, in some embodiments at least some of the data stored in memory 624 and/or at least some of the data communicated using communication module 628 is encrypted using encryption module 636.

Instructions in the various modules in memory 624 may be implemented in: a high-level procedural language, an object-oriented programming language, and/or in an assembly or machine language. Note that the programming language may be compiled or interpreted, e.g., configurable or configured, to be executed by the one or more processors.

Although computer system 600 is illustrated as having a number of discrete items, FIG. 6 is intended to be a functional description of the various features that may be present in computer system 600 rather than a structural schematic of the embodiments described herein. In practice, and as recognized by those of ordinary skill in the art, the functions of computer system 600 may be distributed over a large number of servers or computers, with various groups of the servers or computers performing particular subsets of the functions. In some embodiments, some or all of the functionality of computer system 600 is implemented in one or more application-specific integrated circuits (ASICs) and/or one or more digital signal processors (DSPs).

Computer systems (such as computer system 600), as well as computers and servers in system 500 (FIG. 5) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 510 (FIG. 5) may include: the Internet, World Wide Web (WWW), an intranet, a cellular-telephone network, LAN, WAN, MAN, or a combination of networks, or other technology enabling communication between computing systems.

System 500 (FIG. 5), computer system 600 and/or data structure 700 (FIG. 7) may include fewer components or additional components. Moreover, two or more components may be combined into a single component, and/or a position of one or more components may be changed. In some embodiments, the functionality of system 500 (FIG. 5) and/or computer system 600 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for identifying a group of potential candidates to join an organization, the method comprising:
   receiving an identifier from an individual;
   using the computer system, calculating an affinity metric of the individual with the organization based on information associated with the identifier, wherein the affinity metric of the individual indicates a number of employees of the organization who have social relationship with the individual, and includes at least one of: a number of employees of the organization who know the individual, and a number of employees of the organization who attended a same educational institution as the individual;
   determining whether to include the individual in the group of potential candidates to join the organization based on the affinity metric; and
   upon determining that the calculated affinity metric exceeds a pre-defined threshold, adding the individual to the group of potential candidates.

2. The method of claim 1, wherein the identifier includes a link to a pre-existing profile of the individual.

3. The method of claim 2, wherein the pre-existing profile specifies a social graph associated with the individual; and
   wherein the social graph includes nodes corresponding to individuals and edges corresponding to connections between the individuals corresponding to the nodes.

4. The method of claim 1, wherein the method further comprises associating the individual with a pre-existing profile based on the identifier; and
   wherein the pre-existing profile includes the information.

5. The method of claim 4, wherein the pre-existing profile specifies a social graph associated with the individual; and
   wherein the social graph includes nodes corresponding to individuals and edges corresponding to connections between the individuals corresponding to the nodes.

6. The method of claim 1, wherein the method further comprises generating a profile for the individual based on the identifier and an information source; and
   wherein the profile includes the information.

7. The method of claim 6, wherein the profile specifies a social graph associated with the individual; and
   wherein the social graph includes nodes corresponding to individuals and edges corresponding to connections between the individuals corresponding to the nodes.

8. The method of claim 1, wherein the determining whether to include the individual in the group of potential candidates is further based on attributes associated with the individual.

9. The method of claim 1, wherein the receiving, calculating and determining operations are performed by another organization as a service to the organization.

10. A computer-program product for use in conjunction with a computer, the computer-program product comprising a non-transitory computer-readable storage medium and a computer-program mechanism embedded therein, to identify a group of potential candidates to join an organization, the computer-program mechanism including:
    instructions for receiving an identifier from an individual;
    instructions for calculating an affinity metric of the individual with the organization based on information associated with the identifier, wherein the affinity metric of the individual indicates a number of employees of the organization who have social relationship with the individual, and includes at least one of: a number of employees of the organization who know the individual, and a number of employees of the organization who attended a same educational institution as the individual;
    instructions for determining whether to include the individual in the group of potential candidates to join the organization based on the affinity metric; and
    upon determining that the calculated affinity metric exceeds a pre-defined threshold, instructions for adding the individual to the group of potential candidates.

11. The computer-program product of claim 10, wherein the identifier includes a link to a pre-existing profile of the individual.

12. The computer-program product of claim 11, wherein the pre-existing profile specifies a social graph associated with the individual; and
    wherein the social graph includes nodes corresponding to individuals and edges corresponding to connections between the individuals corresponding to the nodes.

13. The computer-program product of claim 10, wherein the computer-program mechanism further comprises instructions for associating the individual with a pre-existing profile based on the identifier; and
    wherein the pre-existing profile includes the information.

14. The computer-program product of claim 13, wherein the pre-existing profile specifies a social graph associated with the individual; and
    wherein the social graph includes nodes corresponding to individuals and edges corresponding to connections between the individuals corresponding to the nodes.

15. The computer-program product of claim 10, wherein the computer-program mechanism further comprises instructions for generating a profile for the individual based on the identifier and an information source; and
    wherein the pre-existing profile includes the information.

16. The computer-program product of claim 15, wherein the profile specifies a social graph associated with the individual; and
    wherein the social graph includes nodes corresponding to individuals and edges corresponding to connections between the individuals corresponding to the nodes.

17. The computer-program product of claim 10, wherein the determining whether to include the individual in the group of potential candidates is further based on attributes associated with the individual.

18. A computer, comprising:
    a processor;
    memory; and
    a program module, wherein the program module is stored in the memory and configurable to be executed by the processor to identify a group of potential candidates to join an organization, the program module including:
    instructions for receiving an identifier from an individual;
    instruction for calculating an affinity metric of the individual with the organization based on the information associated with the identifier, wherein the affinity metric of the individual indicates a number of employees of the organization who have social relationship with the individual, and includes at least one of: a number of employees of the organization who know the individual, and a number of employees of the organization who attended a same educational institution as the individual;
    instructions for determining whether to include the individual in the group of potential candidates to join the organization based on the affinity metric; and
    upon determining that the calculated affinity metric exceeds a pre-defined threshold, instructions for adding the individual to the group of potential candidates.

\* \* \* \* \*